United States Patent
Reed

(10) Patent No.: US 6,478,335 B2
(45) Date of Patent: Nov. 12, 2002

(54) UNIVERSAL FIT FUEL TANK

(75) Inventor: John Geoffrey Reed, Morgan Hill, CA (US)

(73) Assignee: Custom Chrome, Inc., Morgan Hill, CA (US)

( * ) Notice: Subject to any disclaimer, the term of this patent is extended or adjusted under 35 U.S.C. 154(b) by 0 days.

(21) Appl. No.: 09/800,405

(22) Filed: Mar. 5, 2001

(65) Prior Publication Data

US 2002/0121773 A1 Sep. 5, 2002

(51) Int. Cl.[7] .................................................. B62J 35/00
(52) U.S. Cl. ........................................................ 280/835
(58) Field of Search ................................ 280/830, 834, 280/835

(56) References Cited

U.S. PATENT DOCUMENTS

| | | |
|---|---|---|
| 3,926,274 A | 12/1975 | Morioka et al. |
| 4,401,309 A | 8/1983 | Matsuzaki et al. |
| 4,469,190 A | 9/1984 | Yamaguchi |
| 4,717,163 A | 1/1988 | Tsukiji |
| 5,542,706 A | 8/1996 | Kublv |
| 5,944,216 A | 8/1999 | Inaoka et al. |
| 6,237,710 B1 * | 5/2001 | Mori et al. ............... 180/219 |

FOREIGN PATENT DOCUMENTS

JP 06122388 A * 5/1994 ............ B62J/35/00

* cited by examiner

*Primary Examiner*—Kevin Hurley
(74) *Attorney, Agent, or Firm*—Thompson & Knight LLP; Robert C. Hilton; Max Ciccarelli

(57) ABSTRACT

A universal fit fuel tank includes two forward adjustment channels and one rear adjustment channel. The adjustment channels are formed by attaching a retainer plate over indentations in a tunnel, the tunnel extending longitudinally through the fuel tank. Each retainer plate has an adjustment slot located over each indentation in the tunnel. A bracket is movably attached at each adjustment channel for attaching the fuel tank to a frame. Each bracket is attached to the fuel tank by passing a bolt through a hole in the bracket, through the adjustment slot, and into the adjustment channel, where the bolt threadingly engages a nut.

21 Claims, 3 Drawing Sheets

UNIVERSAL FIT FUEL TANK

BACKGROUND OF THE INVENTION

1. Field of the Invention

This invention relates in general to fuel tanks and in particular to a universal fit fuel tank for use with a motorcycle.

2. Description of Related Art

A common motorcycle fuel tank is formed having an inverse U-shaped transverse cross-section with its lower section bifurcated. The U-shaped portion of the fuel tank is commonly referred to as a tunnel because it extends longitudinally from the front portion of the fuel tank to the rear portion of the fuel tank. The tunnel allows the tank to be mounted on a typical motorcycle frame such that the tunnel straddles an upper frame tube.

Typically, a motorcycle fuel tank is mounted by connecting the tank at two or more locations on the motorcycle frame. Within the tunnel of a typical fuel tank, connection tabs are welded to the walls of the tunnel toward the front and rear portions of the tank. Since the connection tabs are welded, the tabs are immovable relative to the gas tank. Each connection tab typically includes a mounting hole to enable a bolt or other fastener to secure the connection tab to the motorcycle frame.

Motorcycle frames are manufactured in many different shapes and sizes. The sizes and angular placements of the various frame components vary tremendously among different motorcycle designs. Because of the different frame configurations, fuel tanks having welded connection tabs are limited in adaptability. The mounting holes on the connection tabs are prepared so that the tank will attach to a predetermined frame at a predetermined location. When the connection tabs are rigidly mounted to the fuel tank, little variation in frame configuration is allowed.

A need exists, therefore, for a fuel tank capable of being mounted to a wide assortment of frames sizes and configurations. A need also exists for a fuel tank that is easily attached to a motorcycle frame and is simple and inexpensive to manufacture. A need also exists for a fuel tank that can be easily interchanged between motorcycles having different frame configurations.

BRIEF SUMMARY OF THE INVENTION

It is a general object of the present invention to provide a motorcycle fuel tank that is easily adapted to be mounted on a variety of different motorcycle frames. The fuel tank of the current invention includes a tunnel that passes longitudinally from a front portion of the fuel tank to a rear portion. The tunnel has an inverted U-shape with two side walls converging to form an upper wall.

Two forward adjustment channels are located in the side walls of the tunnel toward the front portion of the fuel tank. Each forward adjustment channel is formed by attaching a retainer plate over an indentation in the side wall of the tunnel, the retainer plate having an adjustment slot located over each indentation. A nut is placed in each forward adjustment channel such that a bracket can be attached to the fuel tank at each forward adjustment channel. A bolt is placed through a hole in the bracket, through the adjustment slot, and into engagement with the nut. When the nut and bolt are loosely attached, the bracket is permitted to move parallel to a longitudinal axis of the forward adjustment channel. The movement of the bracket allows alignment of a second hole on the bracket with a hole on a motorcycle frame at a desired forward mounting position.

A rear adjustment channel is similar to the forward adjustment channels. The rear adjustment channel is located in the upper wall of the tunnel toward the rear portion of the fuel tank. The rear adjustment channel is formed by attaching a retainer plate over an indentation in the upper wall of the tunnel, the retainer plate having an adjustment slot located over the indentation. A nut is placed in the rear adjustment channel such that a bracket can be attached to the fuel tank at the rear portion of the fuel tank. A bolt is placed through a hole in the bracket, through the adjustment slot, and into engagement with the nut. When the nut and bolt are loosely attached, the bracket is permitted to move parallel to a longitudinal axis of the rear adjustment channel. The movement of the bracket allows alignment of a second hole on the bracket with a hole on the frame at a desired rear mounting position.

Other objects, features, and advantages of the present invention will become apparent with reference to the drawings and detailed description which follow.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
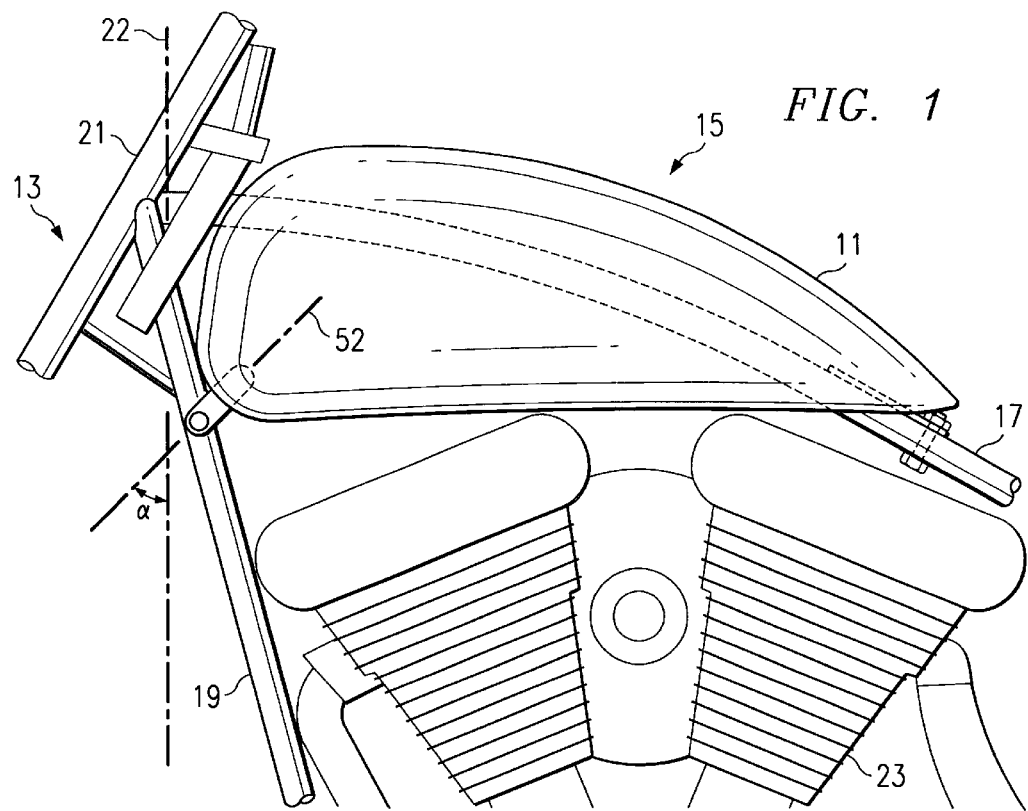
FIG. 1 illustrates a side view of a fuel tank mounted to a motorcycle frame according to the present invention.

Referring to FIG. 1 in the drawings, a motorcycle fuel tank 11 is mounted to a frame 13 of a motorcycle 15. Frame 13 includes an upper frame tube 17, a lower frame tube 19, and a head pipe 21. Frame 13 has a vertical axis 22 that is perpendicular to the surface on which the motorcycle is resting. Although the components and configuration of frame 13 could vary, in the configuration illustrated in FIG. 1, the fuel tank 11 is mounted to upper frame tube 17 and lower frame tube 19. In addition to frame 13, motorcycle 15 includes an engine 23 for powering the motorcycle 15.

Figure 2:
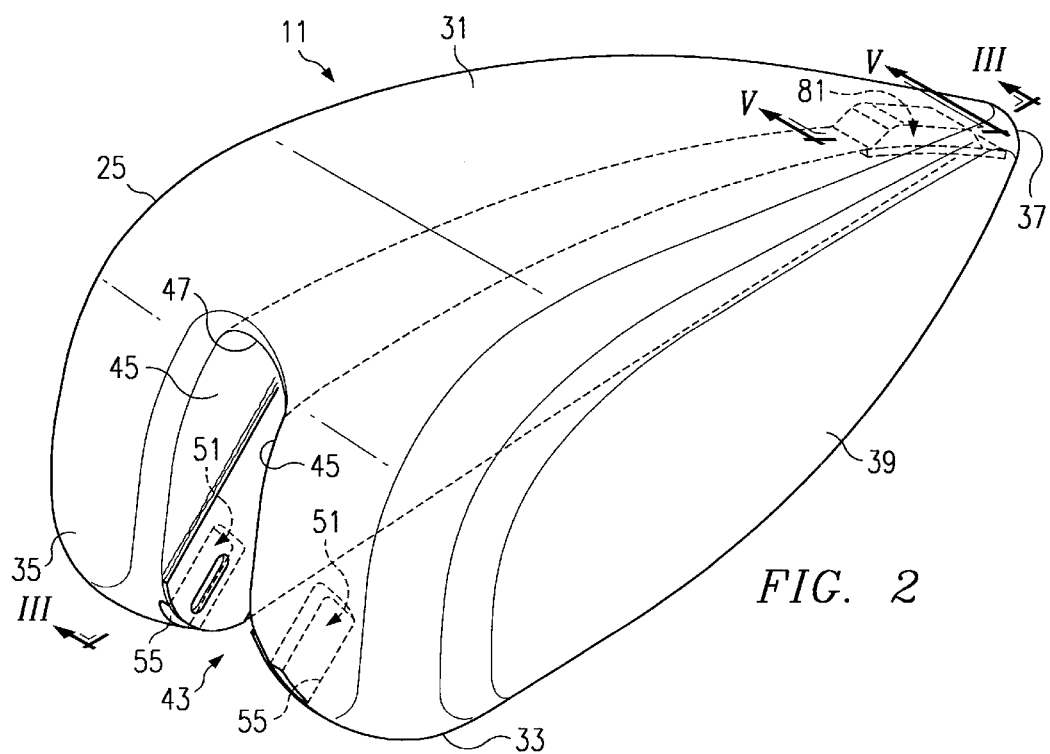
FIG. 2 depicts a perspective view of the fuel tank of FIG. 1.

Referring to FIG. 2 in the drawings, fuel tank 11 includes a housing 25 having an upper surface 31, a lower surface 33, a front 35, a rear 37, and two side surfaces 39. All of the surfaces are generally rounded for aerodynamic and aesthetic reasons. As is typical for motorcycle fuel tanks, fuel tank 11 includes a tunnel 43 having two side walls 45 that converge to form an upper wall 47. Tunnel 43 is an inverted U-shape and extends longitudinally through housing 25 from front 35 to rear 37. The primary purpose of tunnel 43 is to provide clearance for upper frame tube 17 when fuel tank 11 is mounted on frame 13. Fuel tank 11 is essentially divided into two reservoirs because of tunnel 43. Fuel tanks of this configuration are generally referred to as "saddlebag" fuel tanks because the reservoirs straddle upper frame tube 17.

Figure 3:
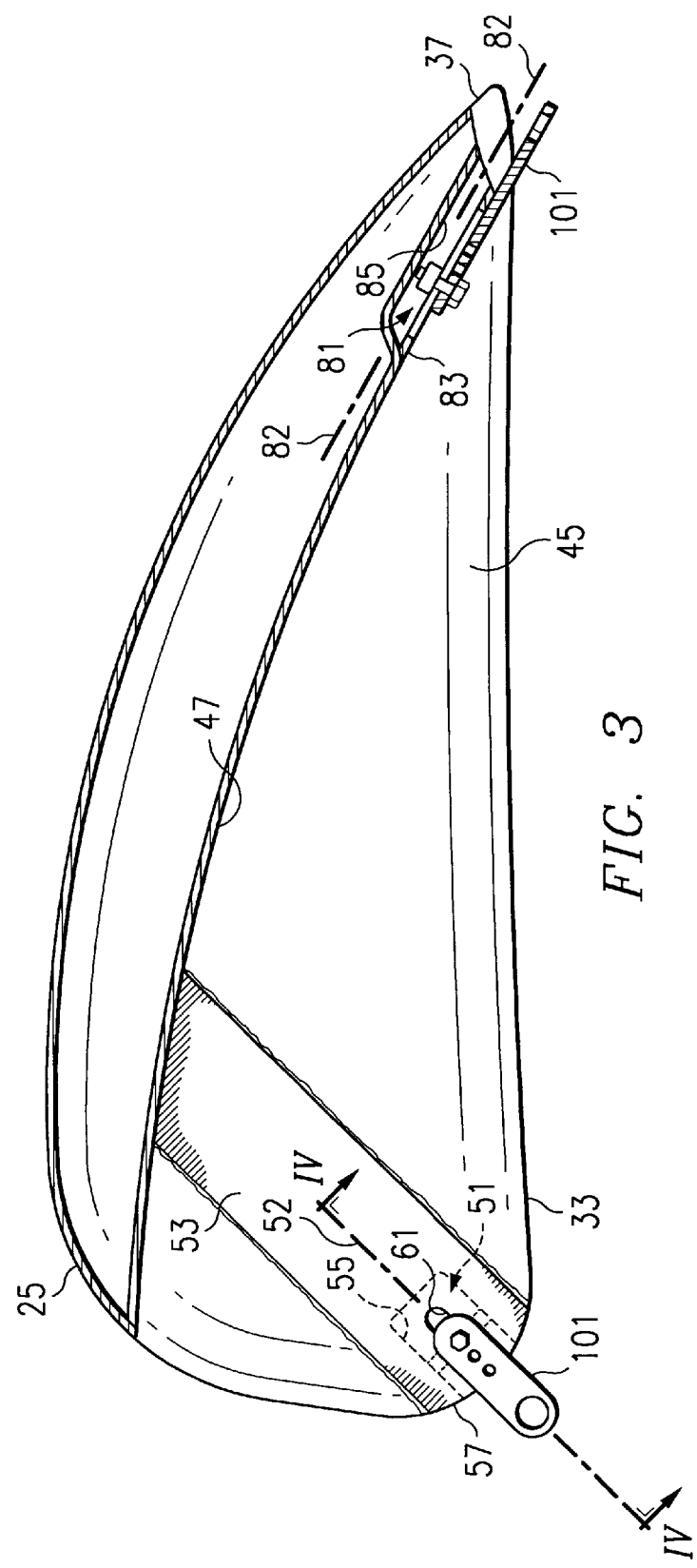
FIG. 3 illustrates a cross-sectional side view of the fuel tank of FIG. 1 taken at III—III, the fuel tank having a forward adjustment channel, a rear adjustment channel, and brackets according to the present invention.
Figure 4:
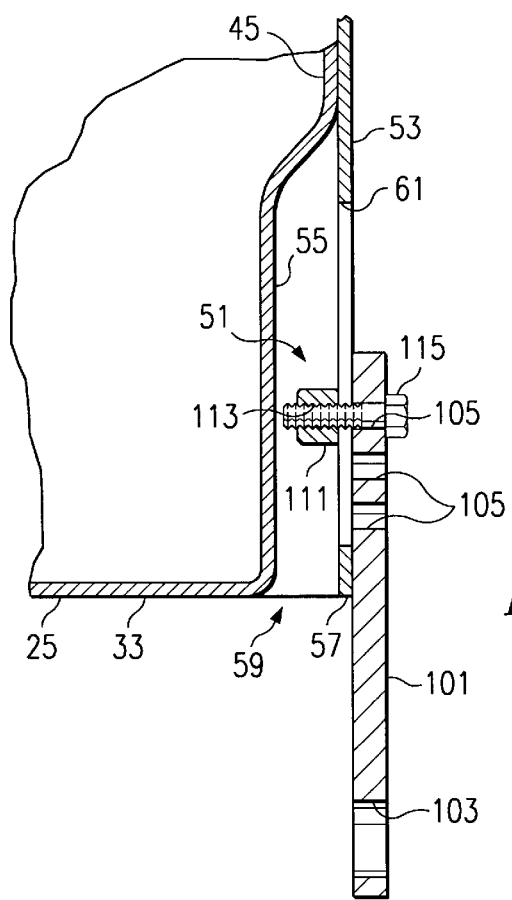
FIG. 4 depicts a cross-sectional front view of the forward adjustment channel of FIG. 3 taken at line IV—IV.

Referring still to FIG. 2, but also to FIGS. 3 and 4 in the drawings, fuel tank 11 includes two forward adjustment channels 51 located in the side walls 45 of tunnel 43 toward front 35 of housing 25. Each forward adjustment channel 51 has a longitudinal axis 52 that is preferably disposed at an angle α of approximately thirty to forty-five degrees to the vertical axis 22 of frame 13 (see FIG. 1). Adjustment channel 51 is formed by attaching a retainer plate 53 to housing 25 such that retainer plate 53 covers an indentation 55 formed in side wall 45 of tunnel 43. Indentation 55 has a longitudinal axis parallel to axis 52, and indentation 55 terminates at lower surface 33. Retainer plate 53 extends around the interior of tunnel 43, covering both indentations 55 and a portion of both side walls 45 and upper wall 47. Although only one retainer plate 53 is used to form both forward adjustment channels 51, it is conceivable that a separate retainer plate 53 could be used for each forward adjustment channel 51.

Retainer plate 53 is preferably welded to the interior of tunnel 43. The edges of retainer plate 53 are machine ground after welding to provide a more finished appearance and to prevent interferences between tunnel 43 and upper frame tube 17. As best seen in FIGS. 3 and 4, retainer plate 53 includes a lower edge 57 which is shaped to match the contour of lower surface 33. Adjacent to lower edge 57 is an opening 59 for forward adjustment channel 51. Opening 59 is defined by the depth of indentation 55 and by the contours of lower surface 33 and lower edge 57. Two adjustment slots 61 pass through retainer plate 53, each adjustment slot 61 being positioned over one of the indentations 55 and each slot 61 having a longitudinal axis parallel to axis 52.

Figure 5:
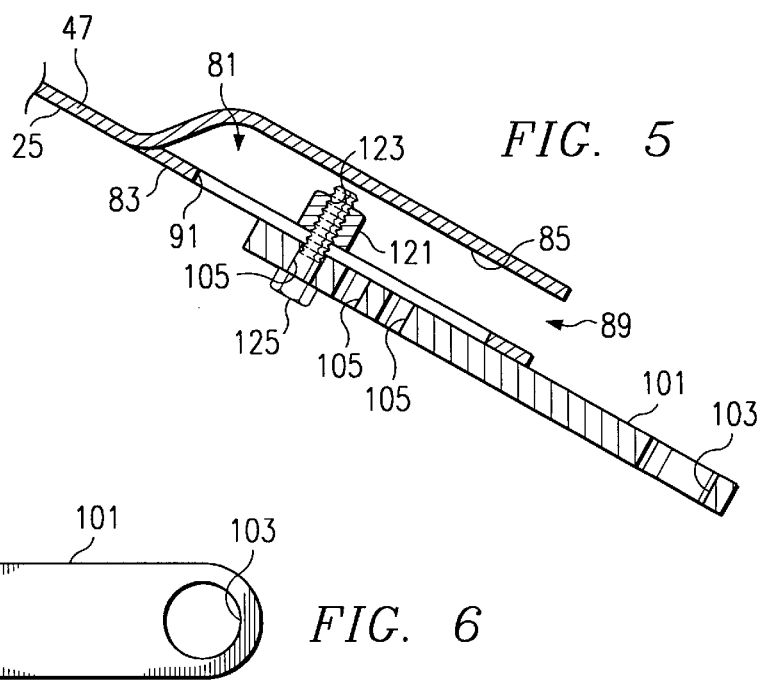
FIG. 5 depicts a cross-sectional side view of the rear adjustment channel of FIG. 3 taken at line V—V.
Figure 6:
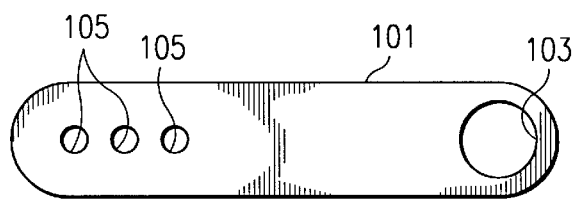
FIG. 6 illustrates a side view of the bracket of FIG. 3.

Referring still to FIGS. 2 and 3, but also to FIG. 5 in the drawings, fuel tank 11 includes a rear adjustment channel 81 located in upper wall 47 of tunnel 43 toward the rear 37 of housing 25. Rear adjustment channel 81 has a longitudinal axis 82 and is formed by attaching a retainer plate 83 to housing 25 such that retainer plate 83 covers an indentation 85 formed in upper wall 47 of tunnel 43. Although rear adjustment channel 81 is located in upper wall 47, it is conceivable that the adjustment channel 81 could be located in one of the side walls 45 of tunnel 43 toward rear 37. The preferred embodiment provides for one rear adjustment channel 81; however, more rear adjustment channels could be used, or the rear adjustment channel could be omitted.

Retainer plate 83 is preferably welded to the interior of tunnel 43. The edges of retainer plate 83 are machine ground after welding to provide a more finished appearance and to prevent interferences between tunnel 43 and upper frame tube 17. An opening 89 is defined by the depth of indentation 85 and by a rear edge of retainer plate 83. An adjustment slot 91 passes through retainer plate 83 and is positioned over indentation 85, the adjustment slot 91 having a longitudinal axis parallel to axis 82.

Referring to FIGS. 3, 4, 5, and also 6, a bracket 101 is movably attached to fuel tank 11 at each adjustment channel 51, 81 to connect fuel tank 11 to frame 13. Bracket 101 includes a first hole 103 at one end of bracket 101 for mounting bracket 101 to a desired location on motorcycle frame 13. A plurality of holes 105 are provided on another end of bracket 101 for mounting bracket 101 to fuel tank 11. The existence of more than one hole 105 allows for even further adaptability of fuel tank 11 with regard to mounting on variously sized and shaped motorcycle frames.

To attach each bracket 101 to forward adjustment channels 51, a nut 111 is placed through opening 59 and into adjustment channel 51. Nut 111 is preferably a rectangular "T-nut" that resists rotation about the nut's longitudinal axis after being placed within the adjustment channel 51. Nut 111 is capable of sliding within forward adjustment channel 51 parallel to longitudinal axis 52. Bracket 101 is placed against retainer plate 53 such that one of the holes 105 is aligned with adjustment slot 61 and a threaded hole 113 within nut 111. The selection of which hole 105 is used depends on the particular size and shape of the frame to which fuel tank 11 is being attached. A bolt 115 is placed through hole 105 and adjustment slot 61, and the bolt 115 is then partially threaded into hole 113 to loosely attach bracket 101 to fuel tank 11. When bracket 101 is loosely attached to fuel tank 11, the bracket 101 can be moved parallel to longitudinal axis 52 and rotated about the axis of bolt 115 to adjust the position of first hole 103 relative to a selected forward mounting location on frame 13. As bracket 101 is moved, nut 111 moves in conjunction with bracket 101 within forward adjustment channel 51.

To attach bracket 101 to rear adjustment channel 81, a nut 121 is placed through opening 89 and into rear adjustment channel 81. Nut 121 is preferably a rectangular "T-nut" that resists rotation about the nut's longitudinal axis after being placed within rear adjustment. channel 81. After being placed within rear adjustment channel 81, nut 121 is capable of sliding within the channel 81 parallel to longitudinal axis 82. Bracket 101 is placed against retainer plate 83 such that one of the holes 105 is aligned with adjustment slot 91 and a threaded hole 123 within nut 121. The selection of which hole 105 is used depends on the particular size and shape of the frame to which fuel tank 11 is being attached. A bolt 125 is placed through hole 105 and adjustment slot 91, and the bolt 125 is then partially threaded into hole 123 to loosely attach bracket 101 to fuel tank 11. When bracket 101 is loosely attached to fuel tank 11, the bracket 101 can be moved parallel to longitudinal axis 82 and rotated about the axis of bolt 125 to adjust the position of first hole 103 relative to a selected rear mounting location on frame 13. As bracket 101 is moved, nut 121 moves in conjunction with bracket 101 within rear adjustment channel 81.

After loosely attaching brackets 101 to fuel tank 11, the fuel tank 11 is placed proximate to frame 11 such that tunnel 43 straddles upper frame tube 17. Brackets 101 attached at the forward adjustment channels 51 are adjusted so that holes 103 are aligned with a forward frame hole in the desired forward mounting location. Usually the forward frame hole is disposed in lower frame tube 19; however, it could be disposed in another component of frame 13. A bolt or pin is then placed through holes 103 and through the forward frame hole at the desired forward mounting location. Brackets 101 are securely tightened to fuel tank 11 by rotating bolts 115. As each bolt 115 is rotated within each nut 111, bracket 101 is securely fastened to fuel tank 11.

Bracket 101 attached at the rear adjustment channel 81 is adjusted within adjustment channel 81 until hole 103 is aligned with a rear frame hole at the desired rear mounting location. Usually, the rear frame hole is located in upper frame tube 17. A bolt or other fastener is placed through hole 103 and the rear frame hole to attach bracket 101 to frame 13. Bracket 101 is then securely tightened to fuel tank 11 by rotating bolt 125. As bolt 125 is rotated within nut 121, bracket 101 is securely fastened to fuel tank 11.

The primary advantage of the present invention is that it provides a fuel tank that is easily mounted to a wide array of motorcycle frames. The adjustment channels disposed in the tunnel of the frame, together with the adjustment slots, allow the brackets to be moved to a plurality of positions so that the brackets can be attached at many different mounting locations.

Another advantage of the present invention is that it provides adjustment channels to facilitate adjustment of the brackets. Since the adjustment channels are formed by indentations in the tunnel, the brackets can be mounted to the tunnel walls without causing interference problems between the tunnel and the upper frame tube of the motorcycle. Still another advantage of the present invention is that the fuel tank is relatively simple and inexpensive to manufacture.

It should be apparent from the foregoing that an invention having significant advantages has been provided. While the invention is shown in only one of its forms, it is not just limited but is susceptible to various changes and modifications without departing from the spirit thereof

I claim:

1. A fuel tank for mounting on a frame of a motorcycle comprising:
    a housing defining a substantially enclosed reservoir for storing fuel, the housing having a tunnel that extends longitudinally through the housing; and
    a bracket adjustably connected to the tunnel and connecting the housing to the motorcycle frame at a first location, wherein the tank can be mounted on a variety of motorcycle frames.

2. The fuel tank of claim 1 further comprising a second bracket adjustably connected to the tunnel for connecting the housing to the motorcycle frame at a second location.

3. The fuel tank of claim 1 further comprising:
    a second bracket adjustably connected to the tunnel for connecting the housing to the motorcycle frame at a second location; and
    a third bracket adjustably connected to the tunnel for connecting the housing to the motorcycle frame at a third location.

4. The fuel tank according to claim 1 further comprising:
    an adjustment channel disposed in the tunnel, the adjustment channel receiving a nut having threads; and
    an adjustment slot for slidably receiving a bolt, the bolt being operably attached to the bracket and passing through the adjustment slot and into the adjustment channel, whereby the bolt threadingly engages the nut.

5. The fuel tank according to claim 4, wherein the adjustment channel is formed by an indentation in a wall of the tunnel, the indentation having a retainer plate disposed thereon.

6. The fuel tank according to claim 4, wherein:
    the adjustment channel is formed by an indentation in a wall of the tunnel, the indentation having a retainer plate disposed thereon; and
    the adjustment channel has a longitudinal axis forming an angle of approximately 30 to 45 degrees with a vertical axis of the motorcycle frame.

7. The fuel tank of claim 1 further comprising:
    a second bracket adjustably connected to the tunnel for connecting the housing to the motorcycle frame at a second location;
    a first adjustment channel disposed in the tunnel, the first adjustment channel receiving a first nut having threads;
    a first adjustment slot for slidably receiving a first bolt, the first bolt being operably attached to the first bracket and passing through the first adjustment slot and into the first adjustment channel, whereby the first bolt threadingly engages the first nut;
    a second adjustment channel disposed in the tunnel, the second adjustment channel receiving a second nut having threads; and
    a second adjustment slot for slidably receiving a second bolt, the second bolt being operably attached to the second bracket and passing through the second adjustment slot and into the second adjustment channel, whereby the second bolt threadingly engages the second nut.

8. The fuel tank according to claim 7, wherein:
    the first adjustment channel is formed by a first indentation in a wall of the tunnel, the first indentation having a first retainer plate disposed thereon; and
    the second adjustment channel is formed by a second indentation in a wall of the tunnel, the second indentation having a second retainer plate disposed thereon.

9. The fuel tank of claim 1 further comprising:
    a second bracket adjustably connected to the tunnel for connecting the housing to the motorcycle frame at a second location;
    a third bracket adjustably connected to the tunnel for connecting the housing to the motorcycle frame at a third location;
    a first adjustment channel disposed in the tunnel, the first adjustment channel receiving a first nut having threads;
    a first adjustment slot for slidably receiving a first bolt, the first bolt being operably attached to the first bracket and passing through the first adjustment slot and into the first adjustment channel, whereby the first bolt threadingly engages the first nut;
    a second adjustment channel disposed in the tunnel, the second adjustment channel receiving a second nut having threads;
    a second adjustment slot for slidably receiving a second bolt, the second bolt being operably attached to the second bracket and passing through the second adjustment slot and into the second adjustment channel, whereby the second bolt threadingly engages the second nut;
    a third adjustment channel disposed in the tunnel, the third adjustment channel receiving a third nut having threads; and
    a third adjustment slot for slidably receiving a third bolt, the third bolt being operably attached to the third bracket and passing through the third adjustment slot and into the third adjustment channel, whereby the third bolt threadingly engages the third nut.

10. The fuel tank according to claim 9, wherein:
    the first adjustment channel is formed by a first indentation in a wall of the tunnel, the first indentation having a first retainer plate disposed thereon;
    the second adjustment channel is formed by a second indentation in a wall of the tunnel, the second indentation having a second retainer plate disposed thereon; and
    the third adjustment channel is formed by a third indentation in a wall of the tunnel, the third indentation having a third retainer plate disposed thereon.

11. The fuel tank according to claim 10 wherein the first and second adjustment channels each have a longitudinal axis forming an angle of approximately 30 to 45 degrees with the vertical axis of the motorcycle frame.

12. A fuel tank for mounting on a frame of a motorcycle, the fuel tank comprising:
a housing defining a substantially enclosed reservoir for storing fuel, the housing having an upper surface, a lower surface, two side surfaces, a front, and a rear, the housing also having a tunnel that extends longitudinally from the front of the housing to the rear;
a first bracket for attaching the housing to the motorcycle frame at a first location;
a first indentation located in the tunnel, the first indentation receiving a first nut for attaching the first bracket to the housing; and
a first retaining plate connected to the housing that substantially covers the first indentation, the first retaining plate having a first adjustment slot for slidably receiving a first bolt for attaching the first bracket to the housing, the first bolt passing through the first adjustment slot and engaging the first nut in the first indentation.

13. The fuel tank according to claim 12 further comprising:
a second bracket for attaching the housing to the motorcycle frame at a second location;
a second indentation located in the tunnel, the second indentation receiving a second nut for attaching the second bracket to the housing; and
a second retaining plate connected to the housing that substantially covers the second indentation, the second retaining plate having a second adjustment slot for slidably receiving a second bolt for attaching the second bracket to the housing, the second bolt passing through the second adjustment slot and engaging the second nut in the second indentation.

14. The fuel tank according to claim 12, wherein the first indentation is located in the tunnel toward the front of the housing.

15. The fuel tank according to claim 12, wherein the first indentation is located in the tunnel toward the rear of the housing.

16. The fuel tank according to claim 12 further comprising:
a second bracket for attaching the housing to the motorcycle frame at a second location;
a second indentation located in the tunnel, the second indentation receiving a second nut for attaching the second bracket to the housing;
a second retaining plate connected to the housing that substantially covers the second indentation, the second retaining plate having a second adjustment slot for slidably receiving a second bolt for attaching the second bracket to the housing, the second bolt passing through the second adjustment slot and engaging the second nut in the second indentation; and wherein
the first indentation is located in the tunnel toward the front of the housing; and
the second indentation is located in the tunnel toward the rear of the housing.

17. The fuel tank according to claim 12 further comprising:
a second bracket for attaching the housing to the motorcycle frame at a second location;
a second indentation located in the tunnel, the second indentation receiving a second nut for attaching the second bracket to the housing;
a second retaining plate connected to the housing that substantially covers the second indentation, the second retaining plate having a second adjustment slot for slidably receiving a second bolt for attaching the second bracket to the housing, the second bolt passing through the second adjustment slot and engaging the second nut in the second indentation; and wherein
the first and second indentations are both located in the tunnel toward the front of the housing.

18. A fuel tank for mounting on a frame of a motorcycle comprising:
a housing defining a substantially enclosed reservoir for storing fuel, the housing having an upper surface, a lower surface, two side surfaces, a front, and a rear, the housing also having a tunnel that extends longitudinally from the front of the housing to the rear, the tunnel being generally U-shaped and defining two side walls and an upper wall;
a first bracket for attaching the fuel tank to the motorcycle frame at a first selected location;
a first indentation located in the upper wall of the tunnel toward the rear of the housing, the first indentation receiving a first nut for attaching the first bracket to the housing;
a first retaining plate connected to the housing for substantially covering the first indentation, the first retaining plate having a first adjustment slot for slidably receiving a first bolt for attaching the first bracket to the housing, the first bolt passing through the first adjustment slot and engaging the first nut in the first indentation;
a second bracket for attaching the fuel tank to the motorcycle frame at a second selected location;
a second indentation located in one of the side walls of the tunnel toward the front of the housing, the second indentation receiving a second nut for attaching the second bracket to the housing; and
a second retaining plate connected to the housing for substantially covering the second indentation, the second retaining plate having a second adjustment slot for slidably receiving a second bolt for attaching the second bracket to the housing, the second bolt passing through the second adjustment slot and engaging the second nut in the second indentation.

19. The fuel tank according to claim 18, wherein:
the first retaining plate is welded to the upper wall of the tunnel to cover the first indentation; and
the second retaining plate is welded to the side wall of the tunnel to cover the second indentation.

20. The fuel tank according to claim 18 further comprising:
a third bracket for attaching the fuel tank to the motorcycle frame at a third selected location;
a third indentation located in one of the side walls of the tunnel toward the front of the housing, the third indentation receiving a third nut for attaching the third bracket to the housing; and
a third retaining plate connected to the housing for substantially covering the third indentation, the third retaining plate having a third adjustment slot for slidably receiving a third bolt for attaching the third bracket to the housing, the third bolt passing through the third adjustment slot and engaging the third nut in the third indentation.

21. The fuel tank according to claim 18 wherein the second indentation forms an angle of approximately 30 to 45 degrees with a vertical axis of the motorcycle frame.

* * * * *